United States Patent [19]

Asanuma et al.

[11] Patent Number: 5,314,956
[45] Date of Patent: May 24, 1994

[54] POLYPROPYLENE RESIN COMPOSITIONS OF HIGH SYNDIOTACTICITY AND PREPARATION PROCESS THEREOF

[75] Inventors: Tadashi Asanuma, Osaka; Tetsunosuke Shiomura, Tokyo; Nobutaka Uchikawa, Osaka; Tutomu Iwatani, Osaka; Katsumi Takeuchi, Osaka, all of Japan

[73] Assignee: Mitsui Toatsu Chemicals, Incorporated, Tokyo, Japan

[21] Appl. No.: 10,787

[22] Filed: Jan. 29, 1993

Related U.S. Application Data

[63] Continuation of Ser. No. 533,757, Jun. 6, 1990, Pat. No. 5,212,247.

[30] Foreign Application Priority Data

Jun. 12, 1989 [JP] Japan ................. 1-146738

[51] Int. Cl.$^5$ .................... C08L 23/12; C08L 23/16
[52] U.S. Cl. .................................................. 525/240
[58] Field of Search ............................................ 525/240

[56] References Cited

U.S. PATENT DOCUMENTS

| | | | |
|---|---|---|---|
| 3,305,538 | 2/1967 | Natta et al. | 260/93.7 |
| 3,629,368 | 12/1971 | Fukuda et al. | 525/323 |
| 4,339,557 | 7/1982 | Hasuo et al. | 525/323 |
| 4,491,652 | 1/1985 | Matthews et al. | 525/323 |
| 4,576,994 | 3/1986 | Dorrer et al. | 525/247 |
| 4,634,740 | 1/1987 | Fajita et al. | 525/240 |
| 4,892,851 | 1/1990 | Ewen et al. | 526/160 |
| 4,946,898 | 8/1990 | Kasahara et al. | 525/323 |
| 5,212,247 | 5/1993 | Asanuma et al. | 525/322 |

FOREIGN PATENT DOCUMENTS

| | | |
|---|---|---|
| 0135834 | 4/1985 | European Pat. Off. . |
| 0316692 | 5/1989 | European Pat. Off. . |
| 0433986 | 6/1991 | European Pat. Off. . |

OTHER PUBLICATIONS

J. Am. Chem. Soc., 1988, 110, pp. 6255-6256.
Evens et al.—Michigan Molecular Institute; 1981 MMI—International Symposium on Transition Metal Catalyzed Polymerizations; pp. 245-263.
Exxon Elastomers For Polyolefin Modification; 1975, pp. 1-4 & 31-35.

*Primary Examiner*—Carmen J. Seccuro, Jr.
*Attorney, Agent, or Firm*—Burns, Doane, Swecker & Mathis

[57] ABSTRACT

Disclosed herein is a polypropylene resin composition of a high syndiotacticity comprising a substantial homopolymer of propylene, in which the ratio of the intensity of the peak attributable to the syndiotactic pentad bonds to the sum of the intensities of all the peaks attributable to the methyl groups in the spectrum of the methyl groups measured by $^{13}$C-NMR is 0.7 or more, and a copolymer of ethylene and propylene, and a preparation process thereof.

1 Claim, No Drawings

POLYPROPYLENE RESIN COMPOSITIONS OF HIGH SYNDIOTACTICITY AND PREPARATION PROCESS THEREOF

This application is a continuation of application Ser. No. 07/533,757, filed Jun. 6, 1990, now U.S. Pat. No. 5,212,247.

BACKGROUND OF THE INVENTION:

(i) Field of the Invention:

This invention relates to a polypropylene resin composition of a high syndiotacticity and a preparation process thereof.

(ii) Description of the Prior Art:

Although the existence of syndiotactic polypropylenes has been known from old days, those produced by a conventional process, in which propylene is polymerized at a low temperature in the presence of a catalyst comprising a vanadium compound, an ether and an organoaluminum, are of low syndiotacticity and hence can hardly be regarded as characterizing syndiotactic polypropylenes. Copolymers of ethylene and propylene are much less regarded as crystalline polypropylenes. On the other hand, a polypropylene of a good tacticity, e.g., a syndiotactic pentad fraction of more than 0.7, has been discovered for the first time by J. A. Ewen et al. by the use of a catalyst comprising a transition metal compound having an asymmetric ligand and an aluminoxane (J. Am. Chem. Soc., 1988, 110, 6255–6256).

The above-mentioned method of J. A. Ewen et al. exhibits a high catalytic activity per unit amount of the transition metal, thus providing a polymer having a high tacticity and relatively properly balanced physical properties. However, molded articles of the polymer are poor in transparency and unsatisfactory in impact resistance at low temperatures.

SUMMARY OF THE INVENTION

The present inventors have made intensive investigations into a polymer, which is free from the foregoing problems and hence has an excellent impact resistance, good transparency and high tacticity, and a preparation process thereof, leading to completion of the present invention.

The present invention provides a polypropylene resin composition of a high syndiotacticity which comprises a substantial homopolymer of propylene, in which the ratio of the intensity of the peak attributable to the syndiotactic pentad bonds to the sum of the intensities of all the peaks attributable to the methyl groups in the spectrum of the methyl groups measured by $^{13}$C-NMR, i.e., the syndiotactic pentad fraction is 0.7 or more, and a copolymer of ethylene and propylene.

The present invention also provides a preparation process of such a resin composition. Specifically, the intended resin composition can be obtained by first polymerizing propylene substantially singly in the presence of a catalyst capable of forming high syndiotactic polypropylenes to produce a syndiotactic polypropylene having a syndiotactic pentad fraction of 0.7 or more, and then copolymerizing ethylene and propylene in the same polymerization reaction system.

The $^{13}$C-NMR spectrum is obtained by measuring in a 1,2,4-trichlorobenzene solution of the homopolymer on the basis of tetramethylsilane, while the syndiotactic pentad fraction is calculated as described by A. Zambelli et al.; Macromolecules vol. 8, 687 (1975) and ibid. vol. 6, 925 (1973), giving a measure for expressing the syndiotacticity of the propylene homopolymer.

Molded articles made of the compositions of the present invention are superb in transparency and impact resistance, particularly in impact resistance at low temperatures, as compared with molded articles made of conventionally known syndiotactic polypropylenes, and hence are of extreme industrial values.

DETAILED DESCRIPTION OF THE INVENTION

The preparation process of the compositions of the present invention will be described below.

As an exemplary catalyst useful in the production of the compositions of the present invention, may be mentioned the catalyst system comprising a transition metal compound having an asymmetric ligand and an aluminoxane, described in the aforesaid literature. It is also possible to use other different catalyst systems in the presence of which homopolymers of propylene having a syndiotactic pentad fraction of 0.7 or more can be produced.

The exemplary preferred catalyst system comprises a transition metal compound and an aluminoxane, as described in the aforesaid literature. The transition metal compound includes isopropyl(cyclopentadienyl-1-fluorenyl)hafnium dihalogenide and isopropyl(cyclopentadienyl-1-fluorenyl)zirconium dihalogenide and those transition metal compounds in which at least one of the halogen atoms is replaced by an alkyl group. A the aluminoxane may be cited compounds represented by the general formula

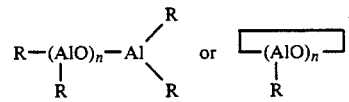

wherein R is a hydrocarbon residue of 1–3 carbon atoms. The compounds wherein R is a methyl group, i.e. methylaluminoxane, and n is 5 or more, preferably 10–100, are particularly useful. The proportion of the aluminoxane used is 10 to 1,000,000 mole times, usually 50 to 5,000 mole times based on the foregoing transition metal compound. In addition to such catalyst systems, it is also possible to use those catalyst systems which comprise the aforesaid transition metal compound, in which at least one of the halogen atoms is replaced by an alkyl group, and jointly a boron compound shown, for example, in Japanese Patent Laid-Open Nos. 501950/'89 and 502036/'89. No particular restrictions are imposed on the polymerization conditions, and hence the solvent polymerization process using inert solvents, the bulk polymerization process in the substantial absence of inert solvents and the gas phase polymerization process may be used. It is common practice to carry out the polymerization at a temperature of $-100°$ to $200°$ C. and a pressure of atmospheric pressure to 100 kg/cm$^2$G. Temperatures of $-100°$ to $100°$ C. and pressures of atmospheric pressure to 50 kg/cm$^2$G are preferred.

To obtain the substantial homopolymer portion of propylene, propylene is polymerized substantially singly. In the present invention, however, the substantial homopolymer of propylene includes homopolymer consisting of propylene units alone and also random copolymers of propylene containing other olefin units such as those of ethylene and butene-1 in an amount of less than 15 mol % based on the whole polymer. The preferred content of other olefin units is 10 mol % or less of the whole polymer. Therefore, the monomer used in the polymerization may embrace not only propylene but also other olefins used together with propylene in amounts equivalent to the formation of the copolymer in the above-described range.

By conducting the polymerization reaction under the foregoing conditions, substantial homopolymers of propylene having a syndiotactic pentad fraction of 0.7 or more can be obtained.

In preferred embodiments for the production of the compositions of the present invention, propylene is first polymerized as described above to form the substantial homopolymer portion, followed by copolymerization of ethylene and propylene in the same polymerization reaction system. The polymerization ratio of ethylene to propylene in this second stage polymerization ranges from 15/85 to 85/15 in molar ratio. If the polymerization is carried out in a ratio outside this range, molded articles made from the resulting composition will have little improved effects in impact resistance at low temperatures. The molar ratios of 20/80 to 80/20 are preferred. In this case, it is also possible to copolymerize other olefins in an amount of about 10 mol %, as required.

The proportion of the amount of polymerization in the first stage to that in the second stage generally ranges from around 95/5 to around 50/50 in terms of polymer weight ratio. If the amount of polymerization in the second (latter) stage is less than in this range, molded articles made from the resulting composition will have no improved effects in impact strength. If it is more than in this range, on the contrary, the molded articles will have poor rigidity.

As the polymerization conditions under which the second stage polymerization is carried out, any polymerization conditions known in the art, which are usually used in the polymerization of so-called block copolymers of isotactic polypropylenes, may be used without alteration.

In order to obtain the compositions of the present invention, it is also advisable to mix a substantial homopolymer of propylene having a syndiotactic pentad fraction of 0.7 or more, prepared in the above-described manner, with a copolymer of ethylene and propylene prepared separately. The polymerization ratio of ethylene to propylene and the polymerization conditions in the preparation of the copolymer are identical with the monomer ratio and the polymerization conditions in the second stage polymerization described above. The mixing ratio of the homopolymer to the copolymer may generally range from around 95/5 to 50/50 in terms of polymer weight ratio.

The present invention will be illustrated by reference to the following examples, in each of which the syndiotacticity of the polymer after polymerization of ethylene and propylene in the second stage is expressed by the value described below.

Namely, the $^{13}$C-NMR spectrum is obtained by measuring in a 1,2,4-trichlorobenzene solution of the polymer on the basis of tetramethylsilane, and the ratio of the intensity of the peak at about 20.2 ppm to the sum of the intensities of the total peaks attributable to the methyl groups in the propylene units at about 19-22 ppm is taken as the syndiotactic pentad fraction of the polymer.

EXAMPLE 1

In 3 l of toluene in an autoclave with a capacity of 7 l were dissolved 15 mg of isopropyl(cyclopentadienyl-1-fluorenyl)zirconium dichloride and 2.01 g of methylaluminoxane having a polymerization degree of about 15. Here, the isopropyl(cyclopentadienyl-1-fluorenyl)zirconium dichloride had been obtained by introducing lithium into isopropylcyclopentadienyl-1-fluorene synthesized in an ordinary manner and then reacting the resulting compound with zirconium tetrachloride, while the methylaluminoxane had been obtained by reacting copper sulfate hexahydrate with trimethylaluminum in toluene. Propylene was charged into the resulting solution up to a pressure of 4 kg/cm$^2$G at 25° C., at which propylene was polymerized for 1 hour while constantly adding propylene to maintain the pressure at 4 kg/cm$^2$G. Then, propylene was purged down to a pressure of 0 kg/cm$^2$G, and a portion of the slurry-like contents was taken out. It was filtered and dried to obtain a powdery homopolymer of propylene. The powder was dissolved in 1,2,4-trichlorobenzene and analyzed by $^{13}$C-NMR. As a result, its syndiotactic pentad fraction was 0.92.

Successively, ethylene was added at 25° C. to a pressure of 2 kg/cm$^2$G and polymerized for 10 minutes. After unreacted monomers had been purged, the autoclave was opened and the contents were filtered. The powder thus-obtained was washed with 1 l of hexane at 25° C. 5 times, and then dried at 80° C. under reduced pressure to obtain 197 g of a polymer. Its analysis by $^{13}$C-NMR clarified that it had an ethylene content of 7.5 wt % and a syndiotactic pentad fraction of 0.81. Further, its intrinsic viscosity (hereinafter referred to as "$\eta$") measured in a tetralin solution at 135° C. was 1.32, and the ratio of the weight average molecular weight to the number average molecular weight (hereinafter referred to as "MW/MN") measured in a 1,2,4-trichlorobenzene solution at 135° C. was 8.7. The proportion of the copolymer portion to the whole polymers, calculated from the concentrations of the slurry before initiation of the copolymerization of ethylene and propylene and after the copolymerization, was 12 wt % and therefore the ethylene content in the copolymer portion can be assumed to be 62 wt %. The resulting powder was press-molded at 210° C. to form a sheet having a thickness of 1 mm, and its properties were measured as follows:

| | |
|---|---|
| Flexural stiffness (kg/cm$^2$) | ASTM D747 (23° C.) |
| Tensile yield strength (kg/cm$^2$) | ASTM D638 (23° C.) |
| Elongation (%) | ASTM D638 (23° C.) |
| Izod impact strength | ASTM D256 |
| (notched) (kg · cm/cm) | (23° C., −10° C.) |
| Haze (%) | ASTM D1003 |

The flexural stiffness was 2,600 kg/cm$^2$, the 5 tensile yield strength was 160 kg/cm$^2$, the elongation was 707%, and values of the Izod impact strength were 68 and 7.6 kg cm/cm (at 23° C. and −10° C., respectively), and the haze was 52%.

COMPARATIVE EXAMPLE 1

Polymerizations were conducted in the same manner as in Example 1 except that no ethylene was used, thereby obtaining a polymer, and the latter was subjected to post treatment to form a sheet. Measurements of the properties of tho polymer and the sheet revealed that the η was 1.06, the syndiotactic pentad fraction was 0.91, the MW/MN was 2.1, the flexural stiffness was 4.600 kg/cm$^2$, the tensile yield strength was 225 kg/cm$^2$, the elongation was 740%, values of the Izod impact strength were 14.1 and 2.1 kg. cm/cm (at 23° C. and −10° C., respectively), and the haze was 68%.

EXAMPLE 2

The procedures of Example 1 were followed except that the ethylene partial pressure during the copolymerization and the copolymerization time were respectively altered to 1 kg/cm$^2$G and 20 minutes, thereby obtaining a polymer. This polymer was then subjected to post treatment to form a sheet. Measurements of the properties of the polymer and the sheet clarified that the ethylene content was 9.2 wt %, the syndiotactic pentad fraction was 0.76, the MW/MN was 8.6, the flexural stiffness was 2,100 kg/cm$^2$, the tensile yield strength was 110 kg/cm$^2$, the elongation was 740%, values of the izod impact strength were 78 and 12.2 kg.cm/cm (at 23° C. and −10° C., respectively), and the haze was 42%. The proportion of the copolymer portion to the whole polymers, calculated from the slurry concentrations before initiating the copolymerization of ethylene and propylene and after the copolymerization, was 18 wt % and hence the ethylene content of the copolymer portion can be estimated at 51 wt %.

We claim:

1. A polypropylene resin composition of a high syndiotacticity which comprises a substantial homopolymer of propylene, in which the ratio of the intensity of the peak attributable to the syndiotactic pentad bonds to the sum of the intensities of all the peaks attributable to the methyl groups in the spectrum of the methyl groups measured by $^{13}$C-NMR is 0.7 or more, and a copolymer of ethylene and propylene, wherein the molar ratio of ethylene units to propylene units ranges from 15/85 to 85/15, and the weight ratio of said homopolymer to said copolymer ranges from 95/5 to 50/50, said polypropylene resin composition having improved transparency over a syndiotactic homopolymer of propylene and being prepared by first polymerizing propylene substantially singly in the presence of a catalyst capable of forming high syndiotactic polypropylene and then mixing said polypropylene with a copolymer of ethylene and propylene prepared separately from said polypropylene.

* * * * *